United States Patent [19]
Uchiyama et al.

[11] Patent Number: 5,543,017
[45] Date of Patent: Aug. 6, 1996

[54] ATMOSPHERIC PRESSURE GLOW DISCHARGE PLASMA TREATMENT METHOD

[75] Inventors: Hiroshi Uchiyama, Hirakata; Masuhiro Kogoma, Wako; Satiko Okazaki, Tokyo, all of Japan

[73] Assignees: E.C. Chemical Co., Ltd., Osaka; Satiko Okazaki, Tokyo; Masuhiro Kogoma, Wako, all of Japan

[21] Appl. No.: 427,687

[22] Filed: Apr. 24, 1995

Related U.S. Application Data

[63] Continuation of Ser. No. 171,636, Dec. 22, 1993, abandoned.

[30] Foreign Application Priority Data

Dec. 24, 1992 [JP] Japan ............... 4-344250

[51] Int. Cl.$^6$ .................................................. B05D 3/06
[52] U.S. Cl. .................. 204/169; 204/165; 427/536
[58] Field of Search .................................. 204/164, 165; 427/535, 536

[56] References Cited

U.S. PATENT DOCUMENTS

| | | | |
|---|---|---|---|
| 3,779,882 | 12/1973 | Rosenthal | 204/165 |
| 3,817,701 | 6/1974 | Thorsen | 204/165 X |
| 4,131,691 | 12/1978 | Morley et al. | 204/165 X |
| 4,276,138 | 6/1981 | Asai et al. | 204/165 |
| 4,337,768 | 7/1982 | Hatada et al. | 204/165 X |
| 4,344,981 | 8/1982 | Imada et al. | 204/165 X |
| 4,560,458 | 12/1985 | Ueno et al. | 204/165 |
| 4,597,843 | 7/1986 | Goupil et al. | 204/165 |
| 4,765,860 | 8/1988 | Ueno et al. | 204/165 X |
| 4,929,319 | 5/1990 | Dinter et al. | 204/164 |
| 5,041,304 | 8/1991 | Kusano et al. | 427/41 |

FOREIGN PATENT DOCUMENTS

| | | |
|---|---|---|
| 0467639 | 1/1992 | European Pat. Off. |
| 0543634 | 5/1993 | European Pat. Off. |
| 1326197 | 8/1973 | United Kingdom |
| 2259185 | 3/1993 | United Kingdom |

*Primary Examiner*—Nam Nguyen
*Attorney, Agent, or Firm*—Sherman and Shalloway

[57] ABSTRACT

An atmospheric pressure glow discharge plasma treatment method, in which a gaseous mixture comprising argon, argon and helium, or argon and hydrogen, mixed with water vapor or water vapor and ketones at room temperature or a specified temperature, is introduced into a plasma reactor having a dielectric-coated electrode comprising a solid dielectric disposed on the surface of at least one of opposing electrodes, and a high-frequency voltage is applied under atmospheric pressure to generate atmospheric pressure glow discharge and excite a plasma, thereby making surface treatment of plastics or fibers disposed between the electrodes.

18 Claims, 2 Drawing Sheets

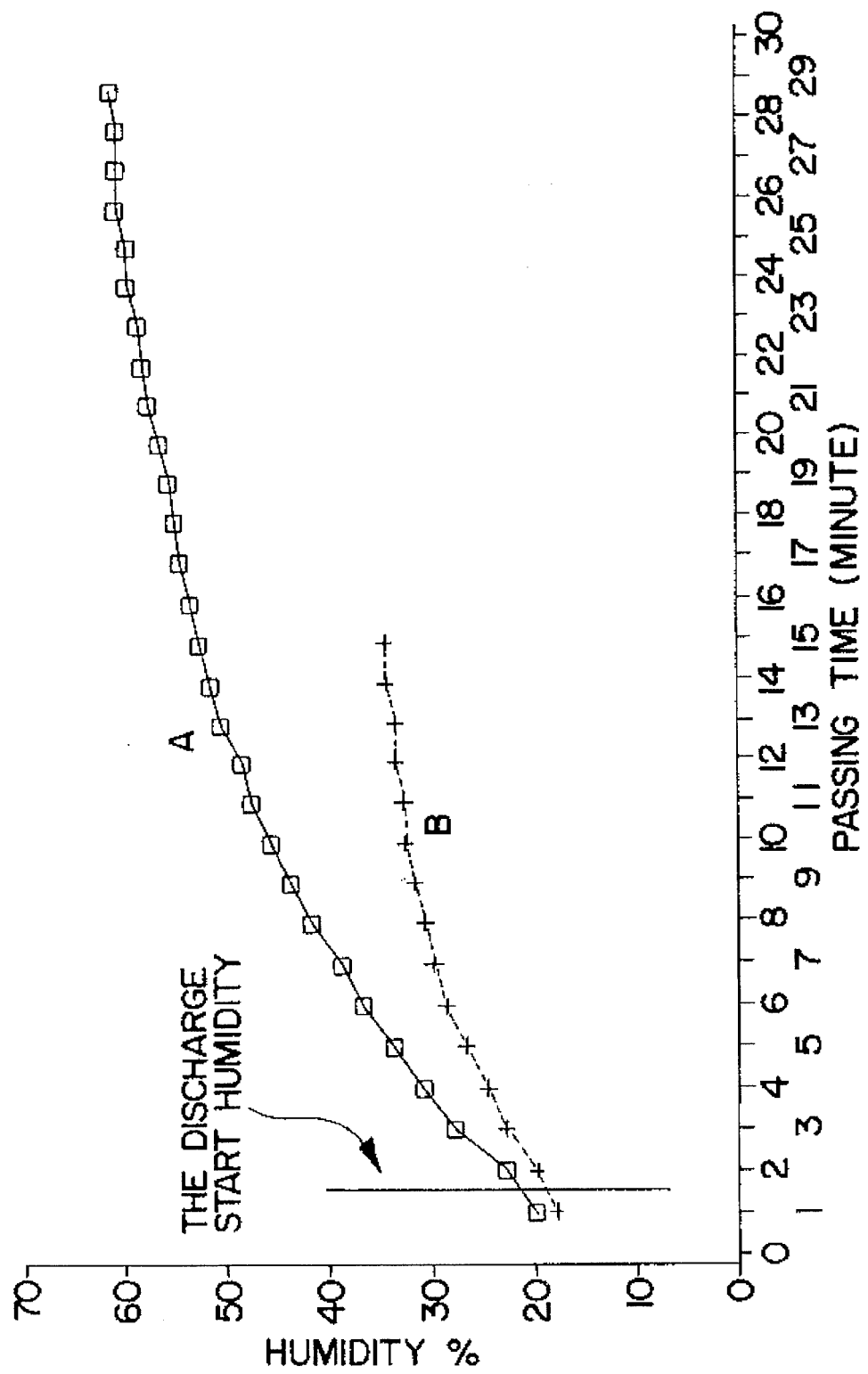

ATMOSPHERIC PRESSURE GLOW DISCHARGE PLASMA TREATMENT METHOD

This application is a continuation of application Ser. No. 08/171,636, filed Dec. 22, 1993, abandoned.

FIELD OF THE INVENTION

This invention relates to a plasma treatment method in which argon, which is difficult to generate glow discharge under atmospheric pressure, of a gaseous mixture mainly comprising argon, is mixed with water vapor, and a glow discharge plasma is generated in the gas atmosphere to provide plastics or fibers with hydrophilicity.

DESCRIPTION OF PRIOR ART

Heretofore, a method in which glow discharge is generated under a high vacuum in an inert gas such as helium or argon, and small amounts of argon ions generated under the high vacuum are utilized to treat the surface of an article to be treated has been practically used, and applied in the electronics industry.

However, since this plasma treatment method requires a high vacuum, the article to be treated must be placed under a high vacuum with a series of accessory equipment such as a discharge apparatus, or a very long sealing portion to change the gas density gradually from a supply unit under atmospheric pressure to a vacuum plasma reactor, and the method cannot be used as a surface treatment method for inexpensive articles such as plastics or textiles in view of the equipment cost and workability.

To overcome such prior art problems, the inventors have been successful to introduce an inert gas such as helium into a plasma generation apparatus, and generate glow discharge under atmospheric pressure to excite a plasma for making surface treatment of an article to be treated. However, when argon is used as the inert gas, it has been difficult to generals glow discharge under atmospheric pressure.

However, through further studies, the inventors have found that stable glow discharge can be generated in the presence of a gas mixture comprising argon and a trace of ketone to make surface treatment of an article such as plastics or synthetic fibers (Japanese Patent Publication 4-74525).

However, since ketone is a combustible organic solvent, even in a small amount, when discharging to the outside after the treatment, it must be absorbed by activated charcoal, or a ketone which is unreactable with water or ketone decomposition products generated by plasma excitation must be absorbed. In particular, since such ketone decomposition products have strong odors which tend to remain on the treated article, a tedious work has been required to put the treated article in a drying bag and heat dried to remove the odors.

OBJECT OF THE INVENTION

Then, the inventors have conducted intensive studies on an atmospheric pressure plasma treatment method which eliminates the above defects resulting from the use of ketones essential to generate glow discharge in argon, which is also advantageous in economy, and accomplished the present invention. Therefore, a primary object of the present invention is to provide an atmospheric pressure glow discharge plasma treatment method which excites a stable glow discharge plasma under atmospheric pressure to treat the surface of an article to be treated, thereby providing the article with hydrophilicity.

SUMMARY OF THE INVENTION

In accordance with the present invention, there is provided a plasma surface treatment method by atmospheric pressure glow discharge in which a gaseous mixture comprising argon, or a mixture of argon and helium or hydrogen, mixed with water vapor or water vapor and ketones at room temperature or a specified temperature, is introduced into a plasma reactor having a dielectric-coated electrode comprising a solid dielectric disposed on the surface of at least one of opposing electrodes, and a high-frequency voltage is applied under atmospheric pressure to generate atmospheric pressure glow discharge and excite a plasma, whereby making surface treatment of plastics or fibers disposed between the electrodes in the plasma reactor.

Discharge is difficult to occur in argon alone or, if occurs, it is silent discharge or spark discharge. In the present invention, argon is saturated with water vapor, for example, by bubbling in a gas cleaning bottle, fed to the plasma reactor to displace the air, a high-frequency voltage is applied to generate atmospheric pressure glow discharge, and an article is disposed between the electrodes to achieve plasma surface treatment.

After the air in the reactor is completely displaced by the gaseous mixture of argon and water vapor, when a voltage of 3,000 Hz, 5,000 V is applied between the upper and lower electrodes, a beautiful pale violet glow discharge occurs. The gap between the upper and lower electrodes at this time is 1 to 50 mm, preferably 6 to 15 mm. If the gap is smaller than 1 mm, the thickness of the article is limited and, if it exceeds 50 mm, the discharge voltage increases, requiring a large power transformer.

In the past, such an inert gas must be dried when used for plasma treatment, usually by passing through a silica gel tube or molecular sieve. Since inert gas used for vacuum plasma tends to be degraded in vacuum degree, an even further dried gas is required. However, when argon is used as the inert gas, glow discharge is achieved by using water vapor-containing argon, or a gaseous mixture mainly comprising water vapor-containing argon. On the contrary, the glow discharge tends to be unstable in helium.

Furthermore, when the water temperature is increased to increase the content of saturation water vapor, the output of glow discharge can be further increased from the normal output of 60 W up to 200 W.

Even when the gas is passed on water in the gas cleaning bottle merely to contain 1% water vapor, rather than attaining saturation, a complete glow discharge is generated, though a longer time required until the beginning of discharge. The relation between the water vapor content and discharge measured by a thermometer is shown in FIG. 4.

FIG. 4 shows the relation between the passing time (abscissas) and the humidity (ordinates) when the gas is passed in or over water contained in the gas cleaning bottle, the temperature measured by a precision thermometer. Line A beginning at about 20% humidity is for the case where the gas cleaning bottle is filled with 110 liter of water, in which the gas is bubbled at a flow rate of 1 liter/min, and line B beginning at about 18% humidity is for the case the gas cleaning bottle is charged with 20 liter of water, over which the gas is passed at a flow rate of 1 liter/rain, showing a temperature of 30° C. in the plasma vessel. The water temperature in the gas cleaning bottle is 21° C.

Furthermore, when a gaseous mixture comprising water vapor containing a small amount of a water-soluble ketone such as acetone or methylethylketone, mixed with argon, argon and helium, or argon and hydrogen, is used, a very stable glow discharge can be generated, with remarkably reduced odors of decomposition products.

The present invention will now be described in detail with reference to the drawings.

In FIG. 1, a dielectric (4) is put on a lower electrode (3) in a plasma reactor (1), a FEP film (5) is placed on top, argon gas is sent from a cylinder (10) through a gas adjuster (9) into water maintained at 30° C. by a water bath (7) at a flow rate of 1 liter/rain to effect bubbling to contain water vapor to saturation. The numeral (8) indicates a flow meter. The gaseous mixture is introduced into the reactor (1) to displace the air, and a high-frequency voltage of 3,000 Hz, 4,000 V is applied to generate glow discharge. Treatment is continued for 30 seconds under this condition, the FEP film is taken out, and the surface wettability is measured by a dyne indicator. The measurement was 54 dynes. After the film was allowed to stand in an atmosphere at 100° C. for 1 hour, the measurement was 50 dynes, with a reduction of only 4 dynes.

For comparison, the same FEP film was treated using a gaseous mixture of argon and helium of 50 parts each, which can generate stable glow discharge. As a result, the film showed a wettability of 50 dynes immediately after the treatment, and 49 dynes after it was allowed to stand at 100° C. for 1 hour, the water vapor-containing gas showing a better result.

When water vapor is contained, the water vapor content increases as the water temperature increases. However, when the reactor is lower in temperature, a mist is generated in the reactor or water drops adhere to the wall surface. Therefore, it is preferable that the reactor is at the same temperature. However, even if a mist occurs, plasma excitation by glow discharge is satisfactory, with no problem.

Alternatively, as shown in FIG. 2, the gas can merely be passed over water in the gas cleaning bottle at room temperature and introduced into the reactor to generate glow discharge, thereby achieving surface treatment of plastics, fibers, and the like as well.

In the atmospheric pressure glow discharge plasma treatment, normally argon and helium are mixed to form an inert gas. This is because helium is easy to discharge and low in the discharge start voltage but, when the argon content is increased, discharge becomes difficult. When the argon content is higher than 70%, glow discharge is not obtained but silent discharge occurs. Even in such a case, a complete glow discharge is obtained by the addition of water vapor, thereby achieving smooth plasma treatment. In the present invention, it is sufficient to use a gaseous mixture comprising 60 to 100 parts of argon and 40 to 0 parts of helium.

Furthermore, a mixture of argon and hydrogen can be used satisfactorily. Specifically, in the mixture of argon and hydrogen, when the argon content is 50% or more, the effect is the same as with the gaseous mixture of argon and helium but, since hydrogen involves a danger, the hydrogen content is preferably up to 5% to argon. With such a composition, glow discharge is not obtained but silent discharge occurs as in the case of argon. However, when the gaseous mixture is saturated with water vapor, the discharge is all glow discharge, and can be used same as argon/helium.

In this case, another inert gas such as nitrogen, neon, krypton, or the like may be mixed so far as the glow discharge is not disturbed.

The above methods are carried out at room temperature or a low temperature of below 100° C., however, alternatively, as shown in FIG. 3, when the inert gas is fed from a gas inlet port (11) to a steam generator (8) having a heater (10), and a mixture of generated steam and the gas passed through a metal tube coil (6) heated by a heater (7) to be superheated to over 100° C. is introduced to the preheated reactor, a stable glow discharge also occurs, thereby enabling plasma treatment of inorganic materials other than plastics or fibers, such as glass and silicon wafer.

The above methods all use water vapor alone. However, when a readily water-soluble ketone such as acetone is added in an amount of about 20% to water, and the method of FIG. 2 is used to mix both acetone and water vapor in the inert gas, glow discharge occurs with no problem. Compared with the case of acetone alone as in the prior art, odors can be considerably reduced, thereby reducing the work for removing odors by heat drying the treated article.

The glow discharge condition is not specifically limited, but it is preferable to use a frequency of 200 to 100,000 Hz, more preferably 500 to 100,000 Hz, and most preferably 1,000 to 100,000 Hz. If the frequency is too low to be below 200 Hz, the discharge becomes unstable and glow discharge is not obtained, which cannot be used. On the other hand, if the frequency is far higher than 100,000 Hz, heat evolution increases and less heat-resistant films tend to deform, which is not preferable.

The conditions of voltage, current, output, and the like for glow discharge are appropriately selected according to the properties of the article to be treated but, in general, a voltage of 2,000 to 4,000 V, a current of 10 to 80 mA, and an output of 10 to 500 W are preferable.

The time of plasma treatment of the article is also appropriately selected according to the properties of the article, but a treatment time of 0.1 to 600 seconds, preferably 5 to 120 seconds, is used.

Since, by the atmospheric pressure plasma surface treatment method according to the present invention, surface treatment can be achieved continuously and rapidly using a remarkably simplified apparatus compared to the prior art vacuum plasma surface treatment method, providing a major breakthrough in industrial technology. Furthermore, the surface modification effect on the article by the inventive atmospheric pressure plasma treatment method, for example, for hydrophobic plastics, can endow the surface with improved hydrophilicity. For example, hydrophilicity obtained by the prior art corona discharge treatment is almost lost in a half day, whereas that obtained by the present invention, for textiles, will not be lost by washing of 20 times or more.

Further, since the atmospheric pressure plasma surface treatment method of the present invention is small in heat evolution during the plasma surface treatment, it has further advantages to be applied to less heat-resistant articles.

With the above-described advantages, the atmospheric pressure plasma surface treatment method of the present invention is applied to good advantage to surface modification of synthetic polymer materials such as plastic sheets, plastic films, synthetic textiles, and synthetic fibers. Such materials include heat-shrinkable films such as polypropylene, polyethylene, and polyvinyl chloride, nylon, polyester, polyimide, fluororesins, aramide resins such as poly-p-phenylterephthalamide, general films and sheets such as vinylacetate/ethylene copolymer, synthetic fibers and chemical fibers such as polyester, polypropylene, nylon, acrylics, acetate, cloths, textiles, and non-woven fabrics of these fibers, and cloths, textiles, and non-woven fabrics from blended fibers of the synthetic fibers and/or chemical fibers and/or natural fibers.

Since the heat-shrinkable polypropylene film treated by the inventive atmospheric pressure plasma surface treatment method has a hydrophilic surface, it can be easily printed by flexographic printing with an aqueous printing ink which could not be applied in the past. Since the polyester textile treated by the atmospheric pressure plasma surface treatment method has improved hydrophilicity, it has improved practical applicability in that moisture absorption is remarkably improved and it can be used for underwear.

BRIEF DESCRIPTION OF THE DRAWINGS

FIG. 4 is a graph showing water content of dried argon passed through the cleaning bottle.

DESCRIPTION OF PREFERRED EMBODIMENTS

The present invention will now be described further in detail with reference to embodiments.

EXAMPLE 1

Figure 1:
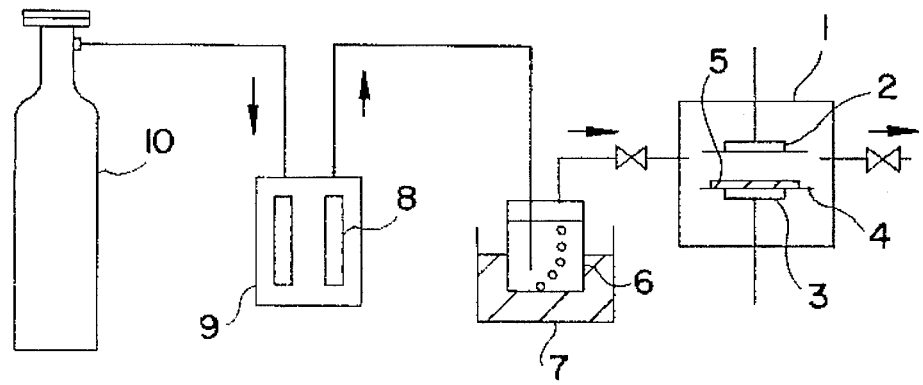
FIG. 1 is a schematic view showing an example of plasma reactor used in the present invention.
Figure 2:
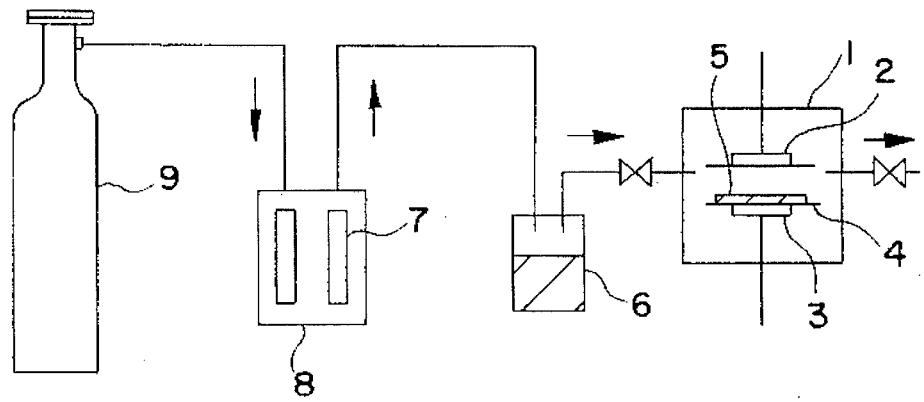
FIG. 2 is a schematic view showing another example of plasma reactor used in the present invention.
Figure 3:
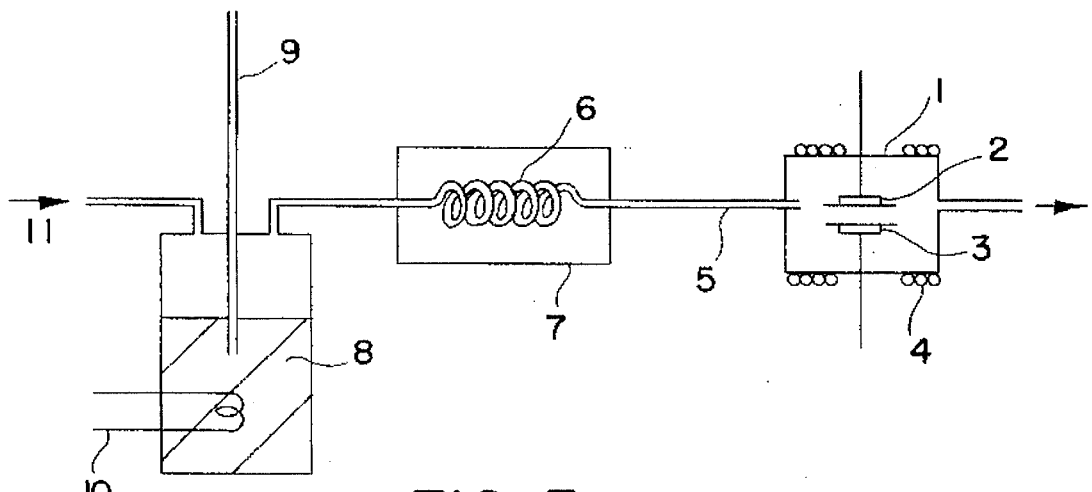
FIG. 3 is a schematic view showing another example of plasma reactor used in the present invention.

Using a plasma reactor shown in FIG. 1, argon from a cylinder passed through a gas adjuster for controlling the flow rate was introduced into the reactor through a gas cleaning bottle filled with water and a temperature set to 40° C. to displace the air. A polyester cloth was placed on a lower electrode in the reactor, and a voltage of 3 kHz, 4,000 V was applied across the upper and lower electrodes to generate pale violet, glow discharge exciting a plasma. When after 30 seconds, the polyester cloth was taken out and floated on water, the treated portion was immediately wetted with water to become transparent. Other portions were not wetted at all, with a substantial difference. The time to wetting is as follows:

| Untreated polyester white cloth | >30 minutes |
| Treated cloth in Example 1 | <1 second |

EXAMPLE 2

The same procedure as in Example 1 was used except that a gaseous mixture of argon/hydrogen was used which contained 2% of hydrogen based on argon.

A polypropylene film was placed on the lower electrode in the reactor, and the same treatment was carried out. The measurement with the dyne indicator showed 54 dyes or more, whereas an untreated film showed 38 dynes or less. After the film was allowed to stand at 100° C. for 1 hour, the measurement was maintained over 50 dynes, with almost no decrease in wetting property.

As described above, in the present invention, argon gas, which is difficult to generate glow discharge, is mixed with water vapor or water vapor and ketones, to generate stable glow discharge. As a result, the atmospheric pressure glow discharge plasma treatment can be carried out to endow the surface of the article to be treated disposed between both electrodes with hydrophilicity, thereby achieving atmospheric pressure glow discharge plasma treatment with improved economy over the prior art atmospheric pressure glow discharge plasma treatment method.

What is claimed is:

1. A plasma surface treatment by atmospheric pressure glow discharge comprising introducing a gaseous mixture comprising argon, a mixture of argon and helium, or a mixture of argon and hydrogen, mixed with about 18% to saturation of water vapor or water vapor and a ketone at room temperature or a specified temperature, into a plasma reactor having a dielectric-coated electrode comprising a solid dielectric disposed on the surface of at least one of opposing electrodes, and applying a high-frequency voltage under atmospheric pressure to generate atmospheric pressure glow discharge and excite a plasma, and surface treating plastics or fibers disposed between the electrodes in the plasma reactor.

2. The method of claim 1 wherein the gaseous mixture of argon and helium comprises 60 to less than 100 parts of argon and 40 to more than 0 parts of helium.

3. The method of claim 1 wherein the gaseous mixture of argon and hydrogen comprises 95 to less than 100 parts of argon and 5 to more than 0 parts of hydrogen.

4. The method of claim 1 wherein water vapor is contained in an amount of saturation in argon/helium, or saturation in argon/hydrogen.

5. The method of claim 1 wherein the water vapor is at a temperature of room temperature to 200° C.

6. The method of claim 1 wherein said ketone is a water-soluble ketone.

7. The method of claim 1 wherein the plasma treatment is carried out at about atmospheric pressure and room temperature and with a saturation amount of water.

8. A plasma treatment method by atmospheric pressure glow discharge comprising introducing a gaseous mixture consisting essentially of argon and about 18% to saturation of water vapor at a temperature of room temperature to about 100° C., into a plasma reactor having a dielectric-coated electrode comprising a solid dielectric disposed on the surface of at least one of opposing electrodes, and applying a high-frequency voltage under atmospheric pressure to generate atmospheric pressure glow discharge and excite a plasma, and surface treating plastics or fibers disposed between the electrodes in the plasma reactor.

9. The method of claim 8 wherein the water vapor is at a temperature of room temperature to 200° C.

10. The method of claim 8 wherein the water vapor is mixed with a water soluble ketone.

11. The method of claim 8 wherein the plasma treatment is carried out at about atmospheric pressure and room temperature and with a saturation amount of water.

12. A plasma surface treatment method by atmospheric pressure glow discharge to make plastics or fibers hydrophillic, comprising introducing a gaseous mixture consisting essentially of argon and about 18% to saturation of water vapor at a temperature of room temperature to about 100° C., into a plasma reactor having a dielectric-coated electrode comprising a solid dielectric disposed on the surface of at least one of opposing electrodes, and applying a high-frequency voltage under atmospheric pressure to generate atmospheric pressure glow discharge and excite a plasma, and surface treating plastics or fibers disposed between the electrodes in the plasma reactor to make them hydrophillic.

13. The method of claim 12 wherein the gaseous mixture contains 60 to less than 100 parts of argon and 40 to more than 0 parts of helium.

14. The method of claim 12 wherein water vapor is contained in an amount of about 18% to saturation in argon/helium.

15. The method of claim 12 wherein the water vapor is mixed with a water soluble ketone.

16. The method of claim 12 wherein the gaseous mixture contains 95 to less than 100 parts of argon and 5 to more than 0 parts of hydrogen.

17. The method of claim 12 wherein water vapor is mixed with a water-soluble ketone.

18. The method of claim 12 wherein the plasma treatment is carried out at about atmospheric pressure and room temperature and with a saturation amount of water.

* * * * *